(12) United States Patent
Kalsani et al.

(10) Patent No.: US 10,208,198 B2
(45) Date of Patent: Feb. 19, 2019

(54) SOLVENTBORNE BINDER FOR AN INTUMESCENT COATING

(71) Applicant: PPG Coatings Europe B.V., Amsterdam OT OT (NL)

(72) Inventors: Venkateshwarlu Kalsani, Gibsonia, PA (US); Ronnie Peskens, Allison Park, PA (US); Kelly E. Lutz, Henderson, KY (US); Simion Coca, Pittsburgh, PA (US)

(73) Assignee: PPG Coatings Europe B.V., Amsterdam (NL)

( * ) Notice: Subject to any disclaimer, the term of this patent is extended or adjusted under 35 U.S.C. 154(b) by 72 days.

(21) Appl. No.: 15/178,582

(22) Filed: Jun. 10, 2016

(65) Prior Publication Data

US 2017/0355844 A1 Dec. 14, 2017

(51) Int. Cl.
| | | |
|---|---|---|
| *C08L 31/04* | (2006.01) | |
| *C09D 131/04* | (2006.01) | |
| *C09D 5/18* | (2006.01) | |
| *C08F 218/08* | (2006.01) | |

(52) U.S. Cl.
CPC ............ *C08L 31/04* (2013.01); *C08F 218/08* (2013.01); *C09D 5/185* (2013.01); *C09D 131/04* (2013.01); *C08L 2201/02* (2013.01); *C08L 2201/56* (2013.01)

(58) Field of Classification Search
None
See application file for complete search history.

(56) References Cited

U.S. PATENT DOCUMENTS

| | | | | |
|---|---|---|---|---|
| 4,440,894 A | * | 4/1984 | Zychowski | C09D 131/04 524/390 |
| 4,657,994 A | * | 4/1987 | Tanaka | B01J 19/18 422/138 |
| 6,191,225 B1 | * | 2/2001 | Barkac | C08F 2/38 427/327 |
| 6,617,382 B1 | * | 9/2003 | Pirig | C09K 21/12 524/100 |
| 7,323,529 B2 | * | 1/2008 | Sutton | C08F 2/00 526/264 |
| 2007/0260021 A1 | * | 11/2007 | Lumpp | C08F 8/28 525/451 |
| 2010/0167609 A1 | | 7/2010 | McLennan et al. | |
| 2012/0028783 A1 | * | 2/2012 | van Boxtel | C08F 218/08 501/32 |
| 2015/0291810 A1 | * | 10/2015 | Peskens | C09D 5/185 428/463 |

FOREIGN PATENT DOCUMENTS

| | | | | |
|---|---|---|---|---|
| FR | 1487678 | | 7/1967 | |
| GB | 1094087 A | * | 12/1967 | ............... C08F 8/12 |

* cited by examiner

*Primary Examiner* — Peter A Salamon
(74) *Attorney, Agent, or Firm* — Lisa Geary

(57) ABSTRACT

Solventborne binder compositions which include a copolymer obtained by reacting a mixture of monomers in the presence of an organic solvent, wherein the monomer mixture includes an ethylenically unsaturated monomer and a vinyl ester monomer having a formula $CH_2CH-X-C(=O)-R$, where R is a linear or branched alkyl group having 2 to 18 carbon atoms, an aromatic group having 6 to 12 carbon atoms, or R is bonded to X to form a 5- to 7-member ring, and X is O. Intumescent coatings containing the solventborne binder compositions, and substrates coated with the intumescent coatings are also disclosed.

22 Claims, No Drawings

SOLVENTBORNE BINDER FOR AN INTUMESCENT COATING

FIELD OF THE INVENTION

The present invention pertains generally to solventborne binder compositions prepared from a monomer mixture comprising vinyl ester monomers, and use of the binder compositions in intumescent coatings.

BACKGROUND OF THE INVENTION

An intumescent coating is one which will produce gases upon heating and decompose to form a cellular carbonaceous char which is then expanded into foam by the release of the produced gases. This foamed insulating layer of carbon protects the underlying substrate by reducing the rate of heating and hence prolongs the time for the substrate to reach critical failure temperature. Intumescent coatings are typically applied to substrates used in the construction industry to provide structures and buildings with improved fire resistance.

It would be desirable to provide solventborne binders which may be useful in intumescent coatings, and intumescent coatings comprising these solventborne binders.

SUMMARY

The present invention is directed to a solventborne binder composition comprising a copolymer obtained by reacting a composition comprising a monomer mixture and an organic solvent, wherein the monomer mixture comprises (i) 70 to 97 percent by weight of an ethylenically unsaturated monomer and (ii) 3 to 30 percent by weight of a vinyl ester monomer having a formula $CH^2CH-X-C(=O)-R$, wherein R is a linear or branched alkyl group having 2 to 18 carbon atoms, an aromatic group having 6 to 12 carbon atoms, or R is bonded to X to form a 5- to 7-member ring, and X is O, wherein the percent by weight is based on the total weight of the monomers (i) and (ii) in the monomer mixture, and monomers (i) and (ii) are different from each other.

The present invention is also directed to intumescent coatings containing these solventborne binder compositions and substrates coated with the intumescent coatings.

DETAILED DESCRIPTION

The present invention provides solventborne binders and an intumescent coatings comprising the solventborne binders, methods of use of the intumescent coatings, and substrates coated with the intumescent coatings.

Throughout this description and in the appended claims, use of the singular includes the plural and plural encompasses singular, unless specifically stated otherwise. For example, although reference is made herein to "an" ethyleneically unsaturated monomer, "a" vinyl ester monomer, "an" organic solvent, "an" acid source, "a" carbon source, and "a" gas source, one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

For example, while certain aspects of the invention have been described in terms of a solventborne binder composition obtained by reacting a mixture comprising an ethyleneically unsaturated monomer and a vinyl ester in an organic solvent, a mixture "consisting essentially of" or "consisting of" an ethyleneically unsaturated monomer and a vinyl ester in an organic solvent is also within the present scope. In this context, "consisting essentially of" means that any additional components will not materially affect the molecular weight, polydispersity, and/or glass transition temperature of the solventborne binder, or will not materially affect the intumescent characteristics of an intumescent coating comprising the solventborne binder.

Furthermore, the use of "or" means "and/or" unless specifically stated otherwise. As used herein, the term "polymer" refers to prepolymers, oligomers and both homopolymers and copolymers, and the prefix "poly" refers to two or more. "Including" and like terms means including, but not limited to. When ranges are given, any endpoints of those ranges and/or numbers within those ranges can be combined within the scope of the present invention.

The term "cure", "cured" or similar terms, as used in connection with a cured or curable composition, e.g., a "cured composition" or "cured coating" of some specific description, means that at least a portion of the film-forming resin or "binder" components that form the coating are polymerized and/or crosslinked, or are dried to form a hardened film. Curing or drying reactions to form the hardened film may be carried out under ambient conditions. By "ambient conditions" is meant the condition of surroundings without adjustment of the temperature, humidity or pressure. Usually ambient temperature ranges from 60 to 90° F. (15.6 to 32.2° C.), such as a typical room temperature, 72° F. (22.2° C.). Once cured or dried, a film-forming resin is stable on exposure to solvents and to moderate heat.

"Essentially free" of a material may be taken to mean that a composition has only trace or incidental amounts of a given material, and that the material is not present in an amount sufficient to affect any properties of the composition. In other words, these materials are not essential to the composition and hence the composition is free of these materials in any appreciable or essential amount. If they are present, it is typically less than 0.1 percent by weight or volume, based on the total solids weight of, or total volume of, respectively, the composition.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Unless otherwise indicated, molecular weights are reported as weight average molecular weights determined by gel permeation chromatography relative to polystyrene standards with the unit of g/mol.

Acrylic and methacrylic are designated herein in a summarizing manner as (meth)acrylic. Likewise, allyl and methallyl are designated herein in a summarizing manner as (meth)allyl. Aliphatic and cycloaliphatic are designated herein in a summarizing manner as (cyclo)aliphatic.

The present invention provides a solventborne binder composition comprising a copolymer obtained by reacting a composition comprising a monomer mixture and an organic solvent. The monomer mixture comprises (i) an ethylenically unsaturated monomer; and (ii) a vinyl ester monomer having a formula (I):

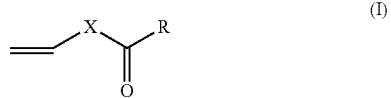

wherein R is a linear or branched alkyl group having 2 to 18 carbon atoms, an aromatic group having 6 to 12 carbon atoms, or R is bonded to X to form a 5- to 7-member ring, and X is O.

The ethylenically unsaturated monomer (i) may comprise a vinyl aromatic compound, an alkyl ester of (meth)acrylic acid or anhydride, an aryl ester of (meth)acrylic acid or anhydride, or combinations thereof.

Examples of vinyl aromatic compounds include vinyl toluene, styrene, and alkyl or aryl ring-substituted styrenes, such as para-methylstyrene, para-tertiary-butylstyrene, p-phenylstyrene, as well as vinyl naphthalenes, and alpha alkyl substituted vinyl aromatics such as alpha methylstyrene.

Examples of alkyl esters of (meth)acrylic acid or anhydride include those wherein the alkyl portion of the ester contains from 1 to 30 carbon atoms, and those in which the alkyl group is linear or branched or (cyclo)aliphatic. Suitable specific monomers include vinyl acetate, vinyl pivalate, vinyl laurate, vinyl dodecanoate, and the like; alkyl (meth)acrylates such as methyl (meth)acrylate, n-butyl (meth)acrylate and t-butyl (meth)acrylate, 2-ethylhexyl (meth)acrylate, isobornyl (meth)acrylate, cyclohexyl (meth)acrylate, t-butyl cyclohexyl (meth)acrylate, trimethyl cyclohexyl (meth)acrylate, lauryl (meth)acrylate, and the like.

Examples of aryl esters of (meth)acrylic acid or anhydride include those in which the aryl group contains from 6 to 30 carbon atoms. Suitable specific monomers include (meth)acrylate esters of secondary and tertiary butylphenol substituted in the 2, 3 or 4 position and nonylphenol.

The monomer mixture of the solventborne binder (i.e., components (i) and (ii) as listed above), may be essentially free or completely free of acid functional monomers, such as carboxylic acid functional monomers (e.g., (meth)acrylic acid).

The solvent in which the monomer mixture of the solventborne binder is reacted is an organic solvent. Exemplary solvents include aromatic solvents such as toluene, xylene, ketones (acetone, MIBK, MAK, etc.), ethyl acetate and butyl acetate, high boiling aromatic solvents and aromatic solvent blends derived from petroleum such as those available from Exxon Mobil Corporation as AROMATIC 100 or SOLVESSO 100.

Particularly suitable solvents, or mixtures thereof, have boiling points greater than 100° C., such as greater than 110° C., or even greater than 150° C. One or more of the monomers of the monomer mixture may be at least partially soluble in the solvent.

The solventborne binder is essentially free of butanol. According to certain aspects of the invention, the solventborne binder may be completely free of butanol.

The organic solvent may be included in the solventborne binder in amounts of up to 30 weight percent, such as up to 20 weight percent or even 10 weight percent, based on the total weight of the monomer mixture and the organic solvent in the solventborne binder.

The ethylenically unsaturated monomer (i) is typically included in the monomer mixture in amounts of from 70 to 97 percent by weight, such as from 75 to 95 percent by weight, or 85 to 95 percent by weight, based on the total weight of all monomers in the monomer mixture. The vinyl ester monomer (ii) is typically included in the monomer mixture in amounts from 3 to 30 percent by weight, such as from 5 to 25 percent by weight, or 5 to 15 percent by weight, based on the total weight of all monomers in the monomer mixture. The total percent by weight for all of the monomers (i.e., (i) and (ii) combined) in the monomer mixture may add to 100 percent. Further, monomers (i) and (ii) are different from each other.

According to the present invention, the ethylenically unsaturated monomer (i) may comprise (a) vinyl acetate monomers and (b) an ethylenically unsaturated monomer other than vinyl acetate. Exemplary ethylenically unsaturated monomers other than vinyl acetate include alkyl esters of (meth)acrylic acid or anhydride wherein the alkyl portion of the ester contains from 1 to 30 carbon atoms, such as lower esters of alkyl ($C_1$-$C_4$) (meth)acrylic acid.

The vinyl acetate monomers (a) are typically included in the ethylenically unsaturated monomer (i) component in amounts of 60 to 97 percent by weight, such as 70 to 95 percent by weight, or 80 to 95 percent by weight, based on the total weight of the monomers (i)(a) and (i)(b). The monomer other than vinyl acetate (b) is typically included in the ethylenically unsaturated monomer (i) component in amounts of 3 to 40 percent by weight, such as 5 to 30 percent by weight, or 5 to 20 percent by weight, based on the total weight of the monomers (i)(a) and (i)(b).

According to the present invention, the vinyl ester monomer (ii) may comprise an α-substituted or α-monosubstituted fatty acid, such as vinyl 2-ethylhexanoate, wherein R is an ethyl in the formula below:

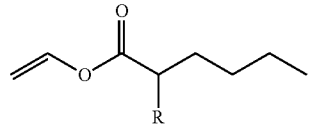

Any α-monosubstituted alkanoic acid vinyl ester may be used, for example, alkanoic acid esters of the formula:

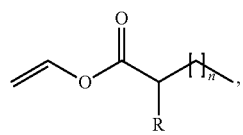

wherein
R is a straight chain, branched or cyclic alkyl group, for example, 2-alkylbutanoic acid or 2-alkylpropanoic acid; and n is suitably 2-20.

Other vinyl esters of α-substituted acids which may be used include vinyl esters of neoalkanoic acids. Vinyl esters of neoalkanoic acids have the following general structure:

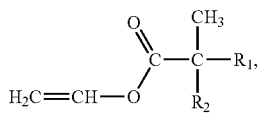

wherein
$R_1$ and $R_2$ are alkyl groups which together may typically collectively contain from about 6-8 carbon atoms. VeoVa™ neoalkanoic vinyl esters are available from Hexion Specialty Chemicals of Columbus, Ohio. In VeoVa™ 9, $R_1$ and $R_2$ together contain about 6 carbon atoms. In VeoVa™ 10, $R_1$ and $R_2$ together contain about 7 carbon atoms. In VeoVa™ 11, $R_1$ and $R_2$ together contain about 8 carbon atoms.

Thus, the present invention also provides a solventborne binder composition comprising a copolymer obtained by reacting a composition comprising a monomer mixture and an organic solvent, wherein the monomer mixture comprises an ethylenically unsaturated monomer (i) comprising (a) vinyl acetate monomers and (b) an ethylenically unsaturated monomer other than vinyl acetate; and (ii) a vinyl ester monomer having a formula (II):

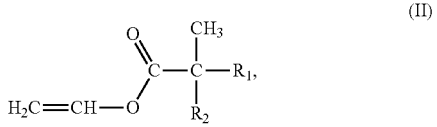

(II)

wherein
R is a linear or branched alkyl group having 2 to 18 carbon atoms, an aromatic group having 6 to 12 carbon atoms, or R is bonded to X to form a 5- to 7-member ring, and X is O. The monomers (i)(a), (i)(b), and (ii) are different from each other.

The copolymer of the solventborne binder compositions of the present invention may be prepared by a batch solution polymerization process, such as that described in Example 1 of U.S. Pat. No. 4,440,894. In such an exemplary process, the organic solvent is charged to a flask equipped with a thermometer, agitator, condenser and dropping funnel. The dropping funnel is charged with the monomer mixture and one or more initiators. The solvent in the flask is heated to about 100° C., such as by using a heating mantle. The contents of the dropping funnel are slowly added to the hot organic solvent in the flask over a period of 4-5 hours, while maintaining reflux temperature. After addition is completed, the contents of the flask may be held at reflux temperature for several additional hours to ensure conversion of monomers to copolymer. Then the product may be cooled and diluted to a desired solids content using additional solvent.

The copolymer of the solventborne binder compositions of the present invention may alternatively be prepared in a pressurized tank by a continuous polymerization process, such as that described in U.S. Pat. No. 7,323,529, incorporated herein by reference in its entirety.

The one or more initiators may be added to the monomer mixture in one or more stages to affect and continue the polymerization process. The initiator typically includes a thermal free radical initiator and optionally one or more solvents, such as those described above for use in the solventborne binder composition. Suitable thermal free radical initiators include, but are not limited to, peroxide compounds, azo compounds, persulfate compounds, and mixtures thereof.

Examplary peroxide compounds include at least hydrogen peroxide, methyl ethyl ketone peroxides, benzoyl peroxides, ditertbutyl peroxides, ditertamyl peroxides, dicumyl peroxides, diacyl peroxides, decanoyl peroxide, lauroyl peroxide, peroxydicarbonates, peroxyesters, dialkyl peroxides, hydroperoxides, and peroxyketals.

Exemplary azo compounds include at least 4-4'-azobis(4-cyanovaleric acid), 1-1'-azobiscyclohexanecarbonitrile, 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethylene-isobutyramidine)dihydrochloride and 2-(carbamoylazo)-isobutyronitrile.

While certain exemplary initiator compounds have been listed, any suitable compound that can initiate polymerization for the monomers of the monomer mixture disclosed herein may be used in the invention.

The conversion (i.e., the chemical transformation of monomers to copolymers) can vary based on the process parameters employed and the characteristics desired (molecular weight, copolymer composition, and the like). In many cases, unreacted monomers can be removed later in the process. The conversion can be, for example, at least 50%, in some cases at least 55%, in other cases at least 60%, in some situations at least 65%, and in other situations at least 75% calculated as the weight percent of copolymer based on the total weight of monomers employed. Also, the conversion can be up to 100%, in some cases up to 99.9%, in other cases up to 99%, in some situations up to 96%, in other situations up to 95%, and in particular situations up to 90% calculated as the weight percent of copolymer based on the total weight of monomers employed. The conversion can be any value or range between any set of values recited above.

After polymerization, the solventborne binder composition often has a solids content of over 90 percent by weight, based on the total weight of the solventborne binder composition. Furthermore, the solventborne binder composition may be mixed with a solvent, such as any of those disclosed herein, to a final solids content of 50 percent by weight or greater, such as 50 to 70 percent by weight, based on the total weight of the solventborne binder composition.

The copolymer of the solventborne binder composition of the present invention typically has a number average molecular weight ($M_n$) and/or weight average molecular weight ($M_w$) of at least 1,000, and in some cases at least 2,000. The copolymer may have a $M_w$ of at least 5,000, and in some cases at least 15,000. The copolymer may have a $M_n$ and/or $M_w$ of up to 500,000, typically up to 100,000, and in some cases up to 50,000. Certain applications may benefit when the $M_n$ of the copolymer is at least 2,000, but not exceeding 7,000. Certain applications may benefit when the $M_w$ of the copolymer is at least 15,000, but not exceeding 25,000. The $M_n$ and $M_w$ of the copolymer may be selected based on the properties that are to be incorporated into the copolymer, solventborne binder comprising the copolymer, and/or intumescent coating composition comprising the solventborne binder. The $M_n$ and/or $M_w$ of the copolymer may vary in any range of values inclusive of those stated above.

The polydispersity index (PDI) of the copolymer produced using the present compositions and methods is typically less than 10, in many cases less than 8.5, and in some cases less than 6.5. As used herein, "polydispersity index" is determined from the following equation: (weight average molecular weight ($M_w$)/number average molecular weight ($M_n$)). A monodisperse polymer has a PDI of 1.0. As used herein, $M_n$ and $M_w$ are determined from gel permeation chromatography using polystyrene standards and have the unit g/mol.

The present invention also provides an intumescent coating composition comprising the solventborne binder composition described herein, an acid source, a carbon source, and a gas source. Certain optional components may additionally be included in the intumescent coating composition, such as an inorganic nucleating agent and/or inorganic filler, a rheology modifier, a flame retardant, a char reinforcer, an organic solvent and/or a liquid carrier.

Under the influence of heat, typically between 100° C. and 200° C., the solventborne binder and certain other components of the intumescent coating may melt and begin to flow. As the temperature increases (>200° C.), the acid source, usually by decomposition, produces copious amounts of acid which can react with other constituents in the coating. If the acid source is a polyphosphate, polyphosphoric acids are released which can react with the carbon source, for example a polyhydric alcohol, to form polyphosphoric acid esters. The decomposition of these esters leads to the formation of carbon compounds, which together with the gas source, for example a blowing agent, give rise to a carbon foam or char.

The intumescent coating compositions of the present invention may contain an acid source, examples of which include phytate derivatives, ammonium polyphosphate, melamine phosphate, magnesium sulphate, ammonium pentaborate, zinc borate, and boric acid. The acid source is typically included in the intumescent coating at from 5 to 40 percent by weight, such as 10 to 35 percent by weight, or 20 to 30 percent by weight, based on the total weight of the intumescent coating composition.

Particularly suitable as an acid source is ammonium polyphosphate, often abbreviated "APP", because it has a high phosphorus content and because it yields phosphoric acid at temperatures below the decomposition temperatures of the carbon and gas sources described below, and yet above the normal temperatures used for processing the intumescent composition. The ammonium polyphosphates are polymeric phosphates, having P—O—P linkages, which may be represented by the formula: $H_{n-m+2}(NH_4)_m P_n O_{3m+1}$, wherein the average value of n is at least about 10, the average value of m is a number up to n+2, and the ratio m/n is in the range of from about 0.7 to about 1.2. The values of n and m for any particular compound will be positive integers, while the average values of n and m for a mixture of compounds constituting the ammonium polyphosphate may each individually be a positive integer or a positive number which is not an integer. Particularly useful ammonium polyphosphates in the intumescent coating compositions of the present invention include those having values of n>1000.

The intumescent coating compositions of the present invention may contain a carbon source which can be a liquid carbon source, a solid carbon source, or a combination thereof. Exemplary carbon sources include organic polyhydroxy-functional compounds, such as the solid carbon sources pentaerythritol, dipentaerythritol, and tripentaerythritol. Starch, sugars such as glycerin, and expandable graphite are other exemplary carbon sources. The carbon source is typically included in the intumescent coating composition from 0.1 to 20 percent by weight, such as 3 to 15 percent by weight, or even 8 to 12 percent by weight, based on the total weight of the intumescent coating composition.

The intumescent coating compositions of the present invention may contain a compound capable of releasing gas upon exposure to heat. Suitable gas sources are those which decompose, or are activated, above 200° C., for example in the range 280 to 390° C. Suitable gas sources are generally nitrogen containing compounds such as melamine, melamine salts, melamine derivatives, urea, dicyandiamide, guanidine, and cyanurates. Specific additional examples include glycine, melamine phosphate, melamine borate, melamine formaldehyde, melamine cyanurate, tris-(hydroxyethyl) isocyanurate (THEIC), or chlorinated paraffin. The gas source is typically included in the intumescent coating at from 3 to 20 percent by weight, such as 3 to 15 percent by weight, or even 8 to 12 percent by weight, based on the total weight of the intumescent coating composition.

The intumescent coating compositions of the present invention may contain a solvent or liquid carrier such as an organic solvent. Exemplary organic solvents include aromatic solvents such as toluene, xylene, ketones (acetone, MIBK, MAK, etc.), ethyl acetate and butyl acetate, high boiling aromatic solvents and aromatic solvent blends derived from petroleum such as those available from Exxon Mobil Corporation as AROMATIC 100 or SOLVESSO 100.

Although not an essential ingredient in intumescent reactions, inorganic "nucleating" agents are often included since they provide sites for the intumescent char to form, and improve the thermal resistance properties and stability of the intumescent char during a fire. Thus, the intumescent coating compositions of the present invention may contain a nucleating agent, examples of which include titanium dioxide, zinc oxide, aluminium oxide, silica, silicates, heavy metal oxides such as cerium oxide, lanthanum oxide and zirconium oxide, calcium carbonite, carbon black, talcum, wollastonite, micaceous iron oxide, china clay, mica and bentonite clay. A nucleating agent such as titanium dioxide may also provide opacity to the coating. The nucleating agent is typically included in the intumescent coating at from 3 to 20 percent by weight, such as 3 to 15 percent by weight, or even 8 to 12 percent by weight, based on the total weight of the intumescent coating composition.

Further additives may be optionally included as part of the intumescent ingredients to aid char formation and to strengthen the char and prevent char degradation. Such additives include solids such as zinc borate, zinc stannate, zinc hydroxystannate, glass flake, glass spheres, polymeric spheres, fibers (ceramic, mineral, glass/silica based), aluminium hydroxide, antimony oxide, boron phosphate, fumed silica. Particularly suitable fibers include engineered mineral fibers that are 100 to 500 microns in length. Such additives may be included in the intumescent coating at from 1 to 5 percent by weight, based on the total weight of the intumescent coating composition.

Further, rheology modifiers, such as a thixotrope may be included in the intumescent coating composition. Suitable thixotropic additives include organically modified inorganic clays such as bentonite clays, hectorite clays or attapulgite clays, organic wax thixotropes based on castor oil and castor oil derivatives, and fumed silica.

To improve or facilitate dispersion of the intumescent ingredients and also to reduce the overall viscosity of the intumescent coating, it may be desired to incorporate wetting/dispersion additives. Such additives are usually liquid in form and can be supplied either containing a solvent or be solvent free.

The intumescent compositions of the present invention may further comprise a halogenated polymeric resin as a flame retardant and/or char expansion agent. A particularly suitable flame retardant includes chlorinated paraffin, which may be included in the composition at from 0 to 15 percent by weight, such as 2 to 10 percent by weight, based on the total weight of the intumescent coating composition.

Furthermore, the pigment volume concentration (PVC) may be 30 to 80 percent, such as from 50 to 75 percent, or even 55 to 70 percent. "PVC", as used herein, is equal to the volume of pigment compared to the total volume of all solids in the coating composition.

The present invention is further drawn to substrates at least partially coated with an intumescent coating composition as described herein. Substrates to which these compositions may be applied include rigid metal substrates, such as ferrous metals, aluminum, aluminum alloys, copper, and other metals or alloys. Exemplary ferrous metal substrates useful in the practice of the present invention include iron, steel, and alloys thereof.

Steel sections requiring fire protection are normally blast cleaned prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating. This is often the case when the intumescent coating is applied on site.

Examples of suitable primers are coatings based on epoxy, modified epoxy (such as modified with polyvinyl butyral), polyurethane, acrylic, vinyl and chlorinated rubber. The thickness of the primer may be in the range from 15 microns to 250 microns, such as in the range from 25 microns to 100 microns.

A topcoat may be applied to the cured intumescent coatings of the present invention, particularly to provide color to exposed steelwork. A topcoat may enhance the durability of the intumescent coating compositions. A clear sealer may also be suitable. Examples of suitable topcoats are coatings based on epoxy, polyurethane, alkyd, acrylic, vinyl or chlorinated rubber. The thickness of the topcoat can vary from 15 microns to 250 microns, such as from 25 microns to 75 microns, as too high a thickness of topcoat may inhibit the intumescent reactions.

Each of the characteristics and examples described above, and combinations thereof, may be said to be encompassed by the present invention. The present invention is thus drawn to the following non-limiting aspects:

(1) A solventborne binder comprising a copolymer obtained by reacting a composition comprising a monomer mixture and an organic solvent, the monomer mixture comprising:
  (i) 70 to 97 percent by weight of an ethylenically unsaturated monomer; and
  (ii) 3 to 30 percent by weight of a vinyl ester monomer having a formula:

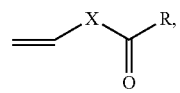

wherein
  R is a linear or branched alkyl group having 2 to 18 carbon atoms, an aromatic group having 6 to 12 carbon atoms, or R is bonded to X to form a 5- to 7-member ring, and X is O;
wherein the percent by weight is based on the total weight of the monomers (i) and (ii) in the monomer mixture, and the monomers (i) and (ii) are different from each other.

(2) The solventborne binder according to aspect 1, wherein the ethylenically unsaturated monomer (i) comprises an ester of lower alkyl ($C_1$-$C_4$) (meth)acrylic acid, vinyl acetate, styrene, or combinations thereof.

(3) The solventborne binder according to any of aspects 1 or 2, wherein the ethylenically unsaturated monomer (i) comprises: (a) a vinyl acetate monomer; and (b) an ethylenically unsaturated monomer other than vinyl acetate.

(4) The solventborne binder according to aspect 3, wherein the ethylenically unsaturated monomer (i) comprises: (a) 60 to 97 percent by weight of the vinyl acetate monomers; and (b) 3 to 40 percent by weight of the ethylenically unsaturated monomer other than vinyl acetate, wherein the percent by weight is based on the total weight of the monomers (i)(a) and (i)(b).

(5) The solventborne binder according to aspect 3, wherein the ethylenically unsaturated monomer (i) comprises: (a) 80 to 95 percent by weight of the vinyl acetate monomers; and (b) 5 to 20 percent by weight of the ethylenically unsaturated monomer other than vinyl acetate, wherein the percent by weight is based on the total weight of the monomers (i)(a) and (i)(b).

(6) The solventborne binder according to any of aspects 1 to 5, wherein the monomer mixture comprises (i) 85 to 95 percent by weight of the ethylenically unsaturated monomer, and (ii) 5 to 15 percent by weight of the vinyl ester monomer, based on the total weight of monomers (i) and (ii) in the monomer mixture.

(7) The solventborne binder according to any of aspects 1 to 6, wherein the vinyl ester monomer (ii) has a formula:

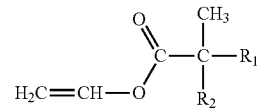

wherein
  $R_1$ and $R_2$ are alkyl groups which together contain 6-8 carbon atoms.

(8) The solventborne binder according to any of aspects 1 to 7, comprising 50% solids by weight or more of the copolymer in the organic solvent based on the total weight of the solventborne binder, wherein the solventborne binder is essentially free of butanol.

(9) The solventborne binder according to any of aspects 1 to 8, wherein the copolymer has a weight average molecular weight of 15,000 to 25,000.

(10) An intumescent coating composition comprising:
  (A) the solventborne binder according to any of aspects 1 to 9;
  (B) an acid source;

(C) a carbon source; and
(D) a gas source.

(11) The intumescent coating composition according to aspect 10, further comprising a liquid carrier, wherein the liquid carrier is an organic solvent included at 10 to 15 percent by weight, based on the total weight of the coating composition.

(12) The intumescent coating composition according to any of aspects 10 or 11, wherein the carbon source comprises an organic polyhydroxy compound.

(13) The intumescent coating composition according to any of aspects 10 to 12, wherein the gas source is selected from melamine, melamine salts, melamine derivatives, or combinations thereof.

(14) The intumescent coating composition according to any of aspects 10 to 13, wherein the acid source is ammonium polyphosphate.

(15) The intumescent coating composition according to any of aspects 10 to 14, further comprising a pigment such as titanium dioxide, and having a pigment volume concentration (PVC) of 55-70% (volume of pigment compared to the volume of all solids).

(16) The intumescent coating composition according to any of aspects 10 to 15, further comprising one or more additives selected from nucleating agents, rheology modifiers, inorganic fillers, and flame retardants.

(17) The intumescent coating composition according to any of aspects 10 to 16, comprising: (A) 20 to 30 weight percent of the solventborne binder; (B) 5 to 40 weight percent of the acid source; (C) 0.1 to 20 weight percent of the carbon source; and (D) 3 to 20 weight percent of the gas source, wherein the weight percent is based on the total weight of the intumescent coating composition.

(18) The intumescent coating composition according to any of aspects 10 to 17, comprising a solids by weight of 75% or greater, based on the total weight of the coating composition.

(19) The intumescent coating composition according to any of aspects 10 to 18, wherein the coating composition, following application to a substrate, achieves a max dry film thickness of greater than 1200 μm for a single coat.

(20) The intumescent coating composition according to any of aspects 10 to 19, wherein the coating composition, following application to a substrate, achieves a pull-off adhesion for a 1000 μm DFT coating of greater than 5 MPa.

(21) A substrate coated at least in part with the intumescent coating composition according to any of aspects 10 to 20.

(22) The substrate according to aspect 21, wherein following an application of the intumescent coating composition, may be overcoated with an additional application of the intumescent coating composition within 10 hours.

The following examples are intended to illustrate the invention, and should not be construed as limiting the invention in any way. Percentages of components are by weight unless otherwise indicated.

EXAMPLES

Example A

Vinyl acetate/butyl methacrylate/VeoVa™ 9 copolymers were synthesized using two pressurized stirred tank reactors in the presence of a peroxy initiator at high temperature and pressure (Table 1). The first reactor had a volume of 300 ml operating at 230° C. under a pressure of 600 psi with a residence time of 5 minutes and an initiator feed at charge B. The second reactor was in-line and had a volume of 1 gallon operating at 160° C. with a residence time of 20 minutes in the presence of chased initiator (Charge C). The copolymer solution was discharged with a gear pump and diluted with more solvent.

TABLE 1

| | INGREDIENTS | Weight (grams) |
|---|---|---|
| | Monomers | |
| Charge A | Vinyl Acetate | 13724.8 |
| | Butyl methacrylate | 2174.3 |
| | VeoVa ™ 9 | 1087.1 |
| | Organic Solvent | |
| | Xylene | 1698.4 (10% v/w based on total monomer weight) |
| Charge B | Di-t-butyl peroxide | 85.5 (0.5% v/w based on total monomer weight) |
| Charge C | Di-t-butyl peroxide | 214.3 (1.25% v/w based on total monomer weight) |

VeoVa ™ neoalkanoic vinyl esters are available from Hexion Specialty Chemicals of Columbus, Ohio.

Charges A and B were added to the 300 mL stirred stainless steel pressure reactor and heated to 230° C. The agitation on the reactor was set at 600 rpms. Charge A was added with a feed rate 60 mL/minute; Charge B was added with a feed rate of 0.31 mL/minute. During addition of the monomers and initiator, the temperature was maintained at 230° C. at 400 psi. Charge C was added to the second reactor with a feed rate of 0.63 mL/minute. After discharge with the gear pump, the copolymer was diluted with more organic solvent (xylene). The final solids of the resulting resin was determined to be 51.4% at 110° C. for one hour. The resin had a weight average molecular weight, $M_w$=20081, a number average molecular weight $M_n$=3260, and a polydispersity $M_w/M_n$=6.2 (determined by gel permeation chromatography using polystyrene as a standard).

Example B

The copolymer (solventborne binder composition) from Example A was used to prepare an intumescent coating (Inventive Coating 4; Table 2). Coatings 1-3 were formulated using resins that are commercially available.

TABLE 2

| | | WEIGHT (g) | | | |
|---|---|---|---|---|---|
| COMPONENT | FUNC-TIONALITY | Coating 1 | Coating 2 | Coating 3 | Coating 4 |
| Xylene | Liquid carrier | 24.05 | 25.13 | 29.41 | 13.04 |
| Resin A | Resin | 16.96 | | | |
| Resin B | | | 14.33 | | |
| Resin C | | | | 11.51 | |
| Resin D | | | | | 25.17 |
| Chlorinated paraffin | flame retardant | 3.09 | 2.98 | 5.75 | 7.74 |
| Fumed silica | Rheology modifier | 0.62 | 0.72 | 0.69 | 0.56 |
| Hydrogenated castor oil | Rheology modifier | 0.52 | 0.60 | 0.58 | 0.46 |
| TiO$_2$ | Pigment | 8.00 | 8.98 | 11.58 | 8.36 |
| China Clay E | Inorganic filler | 2.40 | 2.44 | 2.58 | 1.94 |
| Pentaerythritol | Carbon source | 10.31 | 10.94 | 8.00 | 8.36 |
| Melamine | Gas source | 10.31 | 10.94 | 8.00 | 8.36 |
| Ammonium Polyphosphate | Acid source | 23.74 | 22.94 | 21.90 | 26.01 |

Resin A: a mixture of styrene acrylate resins (50:50 of Pliolite AC80 and Pliolite AC4);
Resin B: a methacrylic resin (Neocryl B-888);
Resin C: a BMA/MMA copolymer (Neocryl B-725);
Resin D: a 50% vinyl-ester resin solution in xylene according to the present invention.

Example C

The vinyl ester resin of the presently disclosed invention was formulated through emulsion polymerization using water as the solvent (resin E) and included in an intumescent coating, as shown in Table 3 (Coating 5). Inventive Coating 4 was compared to Comparative Coating 5 for several characteristics, as shown in Table 4. The waterborne resin (Resin E), which was polymerized with the same monomers as Resin D at a solids content of 51%, was found to have a size of 388 nanometers, indicative of a very high molecular weight.

The coating formulations (Coating 1-5 of Tables 1 and 2) were prepared with a Dispermat-type dissolver equipped with a heavy duty stainless steel dispersion impeller. The solvent based paint (Coatings 1-4) was prepared using the resin solution as grind vehicle for the pigments. The pigments were slowly added at low peripheral speed to maintain temperature <30° C. After all pigments were added, a homogeneous dispersion was obtained by high speed mixing to 45° C. The aqueous paint (Coating 5) was prepared using water and the liquid additives as grind vehicle for the pigments. The pigments were slowly added at low peripheral speed to maintain a temperature <25° C. After all pigments were added, a homogeneous dispersion was obtained by high speed mixing to 35° C. The resin emulsion and urethane rheology modifier were then added at low peripheral speed and homogenized for 5 minutes.

TABLE 3

| COMPONENT | FUNCTIONALITY | WEIGHT (g) Coating 4 | Coating 5 |
|---|---|---|---|
| Xylene | Liquid carrier | 13.04 | — |
| Water | | — | 16.95 |
| Resin D | Resin | 25.17 | — |
| Resin E | | — | 28.48 |
| Hydroxyethylcellulose | Thickening agent | — | 0.19 |
| Sodium salt of a carboxylate polyelectrolyte | Wetting agent | — | 0.14 |
| Nonionic surfactant | Defoamer | — | 0.14 |
| Fungicide based on 2-Octyl-2H-isothiazol-3-one | Biocide | — | 0.01 |
| Butyldiglycolacetate | Coalescent solvent | — | 0.95 |
| Mineral fiber | Char reinforcement | — | 4.75 |
| TiO$_2$ | Pigment | 8.36 | 5.70 |
| Pentaerythritol | Carbon source | 8.36 | 8.54 |
| Ammonium Polyphosphate | Acid source | 26.01 | 23.74 |
| Melamine | Gas source | 8.36 | 8.54 |
| China Clay E | Inorganic filler | 1.94 | 0.95 |
| Chlorinated paraffin | Halogenated flame retardant | 7.74 | — |
| Fumed silica | Rheology modifier | 0.56 | — |
| Nonionic urethane emulsion | Rheology Modifier | — | 0.92 |
| Hydrogenated castor oil | Rheology modifier | 0.46 | — |

Resin D: a 50% vinyl-ester resin solution in xylene according to the present invention;
Resin E: a 50% vinyl-ester resin solution in water The paints were stored for 24 hours at 20° C. prior to application. The paints were applied on milled steel T-shaped beams with an area/volume ratio of 140 in two 500 micrometer dry film thickness coats. The first coat was allowed to dry for 24 hours at 20° C. before application of the second coat. The paints were sprayed using a SataJet 1000B air assisted paint sprayer, operating at 2-3 bar with a 2.0 mm nozzle. The samples were dried for 1 week at ambient conditions followed by 1 week at 40° C. Final film thickness of paint was measured before fire testing, which was performed in accordance with EN13381-8. Fire tests were stopped when a steel temperature of 650° C. was reached. Final film thickness of each coating was measured using an Elcometer 456.

The char expansion factor was determined by measuring the volume increase of the char on the steel beam at 8 points equally spread over its surface. Char cracking and slumping were visually inspected. The char was removed from the steel and cut to assess adhesion and density of the air pockets. All physical properties were rated on a scale of 1 to 5, 1 being the worst and 5 being the best.

TABLE 4

| | Coating 4 (solventborne) | Coating 5 (aqueous) |
|---|---|---|
| Max DFT per coat | 1500 μm | 700 μm |
| Durability without topcoat | C1-C4 ETAG Y | C1-C2 ETAG Z1, Z2 |
| Volume solids | 75% | 70% |
| Overcoat with self | 6 hours | 16 hours |
| Shelf life | 18 months | 6 months |
| Application window | 5-40° C. | 10-40° C. |
| Pull-Off Adhesion 1000 μm DFT, 1 month | 8 MPa | 3 MPa |
| Char Expansion Factor | 40 | 55 |
| Char Cracking* | 4 | 4 |
| Char Slumping* | 4 | 4 |
| Char Adhesion* | 5 | 3 |
| Char Density* | 5 | 5 |

*Physical properties rated on a scale of 1 to 5: 1 being the worst, and 5 being the best.

As shown in Table 4, the maximum dry film thickness (DFT) of a single coat of the inventive solvent based intumescent coating of the present invention is much greater than the max DFT for a waterborne coating (1500 um vs. 700 um, respectively). Furthermore, the dry time for a 500 um coating was much reduced for the solvent based coating when compared to the waterborne coating (6 hours vs. 16 hours, respectively), and both the char adhesion and pull-off adhesion were improved for the solvent based coating. The pull-off adhesion was measured using ASTM D4541 (Standard Test Method for Pull-Off Strength of Coatings Using Portable Adhesion Testers). The pull-off adhesion of the solventborne coating (inventive coating 4; 8 MPa) was more than two times greater than that of the aqueous coating (comparative coating 5; 3 MPa). Finally, the shelf-life was much improved for the solvent based coating (18 months) when compared to the waterborne coating (6 months). The shelf life is generally defined as the maximum age after production at which an unopened can of a coating composition can still be spray applied on a substrate, which generally occurs at a time point when the initial viscosity of the coating composition has doubled. The shortened shelf life of the aqueous coating composition may occur for several reasons, including at least the hydrolysis of certain ingredients in the aqueous solvent water (for example, the acid source) which may thicken the coating composition, and coagulation of the aqueous resin.

Also shown in Table 4 is the durability of the intumescent coating without an applied topcoat. The European Technical Approval Guideline (ETAG) 018-2 is the durability standard specifically developed for passive fire protection (PFP) products such as intumescent coatings. The exposure categories are defined as X (outdoor a.k.a. "exposed"), Y (semi-exposed) and Z1/Z2 (dry internal). The waterborne vinyl acetates are typically only specified for dry internal use (even with topcoat), while the solventborne binder of the present invention may be useful for semi-exposed (without topcoat) and exposed (with topcoat).

The "C" categories define a more general corrosion resistance standard (ISO 12944) which generally defines an exposure environment type. C1 and C2 are rural areas with low pollution, heated buildings and/or neutral atmosphere; C3 is urban and industrial atmospheres with moderate sulfur dioxide levels, production areas with high humidity; and C4 is industrial and coastal areas, or chemical processing plants. The solventborne binder provided an intumescent coating that may be useful across a much broader range of environment types, as is evident in the increased C category shown in Table 4.

It will be appreciated that the following embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

What is claimed is:

1. A solventborne binder comprising:
    a copolymer obtained by reacting a composition comprising a monomer mixture and an organic solvent, the monomer mixture comprising:
        (i) 70 to 97 percent by weight of an ethylenically unsaturated monomer comprising two or more of an ester of lower alkyl ($C_1$-$C_4$) (meth)acrylic acid, vinyl acetate, or styrene; and
        (ii) 3 to 30 percent by weight of a vinyl ester monomer having a formula:

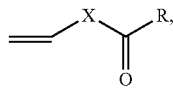

wherein
    R is a linear or branched alkyl group having 2 to 18 carbon atoms, an aromatic group having 6 to 12 carbon atoms, or R is bonded to X to form a 5- to 7-member ring, and X is O,
    wherein the percent by weight is based on the total weight of the monomers (i) and (ii) in the monomer mixture and monomers (i) and (ii) are different from each other, and wherein the composition is essentially free of butanol.

2. The solventborne binder of claim 1, wherein the ethylenically unsaturated monomer (i) comprises an ester of lower alkyl ($C_1$-$C_4$) (meth)acrylic acid and vinyl acetate.

3. The solventborne binder of claim 1, wherein the vinyl ester monomer (ii) has a formula:

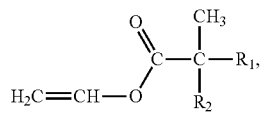

wherein
    $R_1$ and $R_2$ are alkyl groups which together contain 6-8 carbon atoms.

4. The solventborne binder of claim 1, comprising 50% solids by weight or more of the copolymer in the organic solvent, based on the total weight of the solventborne binder.

5. The solventborne binder of claim 4, wherein the copolymer has a weight average molecular weight of 15,000 to 25,000.

6. A solventborne binder comprising:
    a copolymer obtained by reacting a composition comprising a monomer mixture and an organic solvent, the monomer mixture comprising:
        (i) 70 to 97 percent by weight of ethylenically unsaturated monomers comprising: (a) a vinyl acetate monomer, and (b) an ethylenically unsaturated monomer other than vinyl acetate; and
        (ii) 3 to 30 percent by weight of a vinyl ester monomer having a formula:

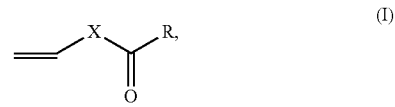

wherein
    R is a linear or branched alkyl group having 2 to 18 carbon atoms, an aromatic group having 6 to 12 carbon atoms, or R is bonded to X to form a 5- to 7-member ring, and X is O,
    wherein the percent by weight is based on the total weight of the monomers (i)(a), (i)(b), and (ii) in the monomer mixture, and monomers (i)(a), (i)(b), and (ii) are different from each other, and wherein the composition is essentially free of butanol.

7. The solventborne binder of claim 6, wherein the ethylenically unsaturated monomer (i) comprises:
    (a) 60 to 97 percent by weight of the vinyl acetate monomer; and
    (b) 3 to 40 percent by weight of the ethylenically unsaturated monomer other than vinyl acetate,
    wherein the percent by weight is based on the total weight of the monomers (i)(a) and (i)(b).

8. The solventborne binder of claim 6, comprising:
    (i) 85 to 95 percent by weight of the ethylenically unsaturated monomer; and
    (ii) 5 to 15 percent by weight of the vinyl ester monomer having the formula (I),
    wherein percent by weight is based on the total weight of the monomers (i) and (ii) in the monomer mixture.

9. The solventborne binder of claim 6, comprising 50% solids by weight or more of the copolymer in the organic solvent based on the total weight of the solventborne binder, wherein the solventborne binder is essentially free of butanol.

10. An intumescent coating composition comprising:
    (A) a solventborne binder comprising a copolymer obtained by reacting a composition comprising a monomer mixture and an organic solvent, the monomer mixture comprising:
        (i) 70 to 97 percent by weight of an ethylenically unsaturated monomer comprising two or more of an ester of lower alkyl ($C_1$-$C_4$) (meth)acrylic acid, vinyl acetate, or styrene, and
        (ii) 3 to 30 percent by weight of a vinyl ester monomer having a formula (I):

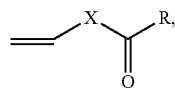

wherein
- R is a linear or branched alkyl group having 2 to 18 carbon atoms, an aromatic group having 6 to 12 carbon atoms, or R is bonded to X to form a 5- to 7-member ring, and X is O,
- wherein percent by weight is based on the total weight of the monomers (ii) and (ii) in the monomer mixture, and monomers (i) and (ii) are different from each other, and
- wherein the composition is essentially free of butanol;

(B) an acid source;
(C) a carbon source; and
(D) a gas source.

11. The intumescent coating of claim 10, wherein the solventborne binder (A) comprises:
   (i) 85 to 95 percent by weight of the ethylenically unsaturated monomer; and
   (ii) 5 to 1.5 percent by weight of the vinyl ester monomer having the formula (I),
   wherein percent by weight is based on the total weight of the monomers (i) and (ii) in the monomer mixture.

12. The intumescent coating composition of claim 10, wherein the vinyl ester monomer (ii) of the solventborne binder (A) has a formula (II) of:

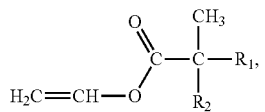

wherein
- $R_1$ and $R_2$ are alkyl groups which together contain 6-8 carbon atoms.

13. The intumescent coating composition of claim 10, wherein the ethylenically unsaturated monomer (i) of the solventborne binder (A) comprises:

(i)(a) 60 to 97 percent by weight of the vinyl acetate monomer; and
(i)(b) 3 to 40 percent by weight of monomers of the ester of lower alkyl ($C_1$-$C_4$) (meth)acrylic acid or styrene,
wherein the percent by weight is based on the total weight of the monomers (i)(a) and (i)(b).

14. The intumescent coating composition of claim 10, wherein the organic solvent of the solventborne binder (A) has a boiling point of at least 120° C.

15. The intumescent coating composition of claim 10, wherein the solventborne binder (A) comprises 50% solids by weight or more of the copolymer in the organic solvent based on the total weight of the solventborne binder (A), wherein the solventborne binder is essentially free of butanol.

16. The intumescent coating composition of claim 10, comprising:
   (A) 20 to 30 weight percent of the solventborne binder;
   (B) 5 to 40 weight percent of the acid source;
   (C) 0.1 to 20 weight percent of the carbon source; and
   (D) 3 to 20 weight percent of the gas source,
   wherein weight percent is based on the total weight of the coating composition.

17. The intumescent coating composition of claim 16, further comprising 10 to 15 weight percent of a liquid carrier, wherein the coating composition has a solids by weight of 75% or greater, based on the total weight of the coating composition.

18. The intumescent coating composition of claim 10, wherein the coating composition, following application to a substrate, achieves a pull-off adhesion for a 1000 pin OFT coating of greater than 5 MPa.

19. The intumescent coating composition of claim 10, wherein the coating composition, following application to a substrate, achieves a max dry film thickness of greater than 1200 μm for a single coat.

20. A substrate coated at least in part with the intumescent coating composition of claim 10.

21. The solventborne binder of claim 1, wherein the organic solvent has a boiling point of at least 120° C.

22. The solventborne binder of claim 6, wherein the ethylenically unsaturated monomer other than vinyl acetate, component (i)(b), comprises an ester of lower alkyl ($C_1$-$C_4$) (meth)acrylic acid, styrene, or a combination thereof.

* * * * *